No. 802,471. PATENTED OCT. 24, 1905.
J. H. POWRIE.
HELIOCHROMIC PLATE AND THE PROCESS OF MAKING THE SAME.
APPLICATION FILED OCT. 25, 1901.

Witnesses:

Inventor:
John H. Powrie
By Louis K. Gillson Atty.

UNITED STATES PATENT OFFICE.

JOHN H. POWRIE, OF CHICAGO, ILLINOIS.

HELIOCHROMIC PLATE AND THE PROCESS OF MAKING THE SAME.

No. 802,471.   Specification of Letters Patent.   Patented Oct. 24, 1905.

Application filed October 25, 1901. Serial No. 79,967.

*To all whom it may concern:*

Be it known that I, JOHN H. POWRIE, a citizen of the United States of America, and a resident of Chicago, county of Cook, and State of Illinois, have invented certain new and useful Improvements in Heliochromic Plates and the Process of Making the Same, of which the following is a specification and which are illustrated in the accompanying drawings, forming a part thereof.

This invention relates particularly to so-called "tricolor-screens" as used in the art of heliochromy and in the process of producing the same, but is applicable also to multicolor photographs and their production. Heretofore such screens have usually been produced by ruling with colored ink upon a plate having a gelatinous pellicle. Such method has been so expensive as to render its practice almost prohibitive, the expense arising not only from the extreme delicacy of the ruling-machine, but as well from the extreme delicacy of the operation itself, seriously affected as it is by variations in temperature, changes in the degree of moisture in the atmosphere, the presence of dust in the slightest quantity, the difficulty of mixing and preserving the inks, &c.

With view to overcoming these difficulties and to greatly simplifying and cheapening the production of these screens and to producing a screen of the highest degree of perfection and durability this invention consists in a screen in the form of a transparent plate having one of its faces covered by a series of juxtaposed bands (usually called "lines" in the art) of extreme fineness, usually red, green, and blue in color, the bands being formed on the plate by a combined photographing and dyeing process, as hereinafter fully described.

Figure 1:
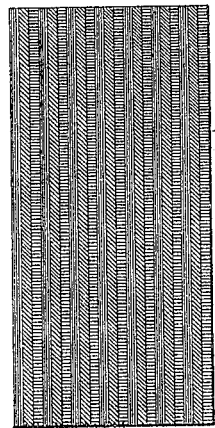
Figure 2:
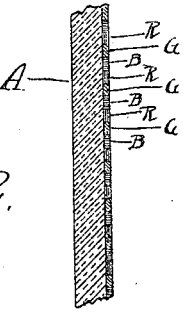

In the accompanying drawings, Figure 1 is a face view of the improved screen, the lines thereon being greatly exaggerated in size. Fig. 2 is a transverse section of the screen.

The plate A is of glass and of any suitable size and shape, and one of its surfaces is covered with bands, as R G B, respectively, red, green, and blue in color, and formed of a substance, such as gelatin or albumin, or both combined, capable of carrying a chemical rendering it sensitive to the action of actinic rays dyed to give it the desired color, the substance of which all the bands are formed being contiguous to the plate, so that all of the bands are in exactly the same plane, while each is structurally independent of the others. These bands may be as fine as desired. In practice they will vary from three hundred to eight hundred to the inch and may, if desired, be less or more numerous than as stated. I have found satisfactory results to follow the use of four hundred to the inch. The method of producing this screen is as follows: The plate A is first coated with a thin sensitized film. This film consists of gelatin or albumin or an admixture of the two or of any other suitable substance or compound sensitized by the addition of a suitable chemical, such as a bichromate salt. To the film side of this plate there is applied the ruled face of a screen covered with alternate transparent and opaque bands, the former being of the desired width of the bands to be formed upon the color-screen and the latter being of double this width. Actinic rays are now passed through the ruled plate to the sensitized plate, and the exposed portions of the latter are thereby acted upon. The two plates being separated, the sensitized plate is developed by any known means, and such of its pellicle as was not acted upon is washed away. A dye, and for this purpose I prefer to employ suitable coal-tar dyes, is now applied to the plate and is absorbed by the film substance remaining thereon. The exposure of the plate should not have been carried too far, as the tanning of the filament may be sufficient to so far lessen its porosity that it will not freely take the dye. On the other hand, the exposure should be long enough to insure the stability of the bands, notwithstanding the washing to which the plate must be subjected, and to prevent the filament from taking the dye too readily. If the dye is too readily absorbed, it will wash out in the cleansing of the plate. I have found it desirable in practice to first apply a green dye. The dye is now set or mordanted by any suitable means known to the dyer's art. I have found very satisfactory results to follow the use of two different coloring substances, the one acting as a mordant for the other and in some instances intensifying the color—as, for example, victoria green and emerald green or thiazine red R and safranin. The plate is now thoroughly washed so as to remove the dying material from its uncovered portions, thereby leaving a series of bands of the desired width with transparent intervals between them of double their width. The plate is next treated to a suitable bath for toughening and hardening the material forming the vehicle for carrying the dye so as to render it substantially non-porous. For this purpose I have used a bath containing about one pound of tannic acid in one gallon of water and in which about one-half pound of common alum has been dissolved, though I do not limit myself to such material. The action seems to have the effect of hardening or toughening the material or contracting it down to the glass. I am not able to explain the precise chemical or physical change that takes place; but the result is a thinner film unsusceptible to most colors, while the dyes with which it has been treated are more permanently fixed and their color brightened. The plate being again carefully cleaned, the same surface is coated with a sentizing solution as before, and to this surface there is applied the ruled surface of the light screen or ruled plate above referred to as having alternately transparent and opaque bands, the two plates being so arranged relatively that the colored bands formed upon the former are covered by the opaque portion of the latter, the edges of each coinciding at one side, so that one half of the intervening space between the green bands is covered by the opaque portions of the light screen, the other half thereof registering with the transparent portions of the screen. The two plates being again exposed to actinic rays, the exposed portions of the sensitized plate are acted upon as before, and the plate is then treated in the same manner as after the first exposure, as above described, the dye made use of being, however, different, as a matter of course, and being either red or blue. I prefer to apply the red dye in the second operation. After this dye has been mordanted and the carrying-vehicle duly toughened or hardened as before the entire operation of sensitizing, exposing, developing, dyeing, mordanting, and toughening is repeated, although the last-named operation is not essential, though preferable, the dye used being the remaining color to be applied—blue—if red and green have already been used. The screen is now complete and ready for service either for the purpose of screening the rays in making a negative or in viewing a positive or for the application thereto directly of sensitized material on which the negative may be formed. If intended for either of the former uses, its colored surface is preferably protected by means of a transparent varnish. If intended for the last-named use, its surface is preferably treated with a waterproof coating of rubber-cement and benzin, upon which is superimposed a thin tough varnish of celluloid or collodion. By means of this process not only may the pellicle of the screen be made of uniform thickness, but the dyed substance is applied directly to the face of the plate, so that all of the colored bands are exactly in the same plane. This is secured by the treatment of the sensitized material after dyeing, as above described, so that it becomes non-porus, rendering it possible to perform the subsequent dyeing operations without covering the plate with varnish to protect the bands already formed and without any more effect upon these bands than the coloring-matter will have upon the clean glass. Caution is required in the selection of the dyes with reference to their permanency and for a further reason that it is more difficult to protect the toughened material from some of the dyes giving the desired colors than from others. In practice I have used in forming the green bands victoria green, emerald green, and auramine yellow dissolved in hot water and acidified with acetic acid. In forming the red bands I have used thiazin red R and a safranin solution, and in securing the blue bands I have used various acid blue dyes, soluble blue, methyl blue, or methyl violet in acetic-acid solution. Other dyes may be used, and those named are not of equal efficiency. I do not, however, limit myself to the particular dyestuffs above mentioned, as various others may be used successfully.

The color-screen formed by the above-described process differs from ruled screens or any other color-screens of which I have any knowledge in that the bands while lying closely in juxtaposition are each independent structurally of all of the others. I have observed in ruled plates on which there is employed a continuous or homogeneous pellicle to which the coloring-matter is applied the colors have a tendency after a time to spread and intermingle. This difficulty is entirely obviated in the screen forming the subject of this application, as each band is fixed and its color thoroughly mordanted independently of the others.

By reason of that treatment of the dyed bands, which I have characterized above as the "toughening" or "hardening" process, the substance is contracted down to the plate and rendered thinner, so that its transparency is increased, and as it becomes unsusceptible to the action of the dyes used in the subsequent operations it is not necessary to protect the completed bands by a covering, such as varnish, an expedient which would be highly undesirable, because the coating would necessarily be applied as well to the surface of the plate, thus throwing the subsequently-formed bands above those already perfected. Inasmuch as the thickness of any protecting-coating which might be applied would be as great as the width of the bands, it is obvious that when viewed obliquely transparent portions would appear between some of the bands, while others would seem to overlap.

Though I have described the screen as tricolor, I do not limit myself in this particular, as under some circumstances less or more colors may be desirable, and it is obvious that either variation would come within the scope of the invention.

In the foregoing description I have referred to the arrangement of the colors upon the screen as being in bands. The screen is the same in its general aspects as the tricolor-screen produced by Du Hauron in 1867 and subsequently by others, and the arrangement of colors has been generally referred to in publications relating to the art as "lines," an obviously erroneous use of the term, as the band must necessarily have some width.

The invention is applicable also to pictures produced by the triple negatives of the photochromoscope, the several sections of the object differentiated by color being successively photographed in the well-known manner, the unaltered portions of the film being washed away after each exposure and the remaining portion suitably dyed, the dye being mordanted, the plate being treated to the above-described toughening or hardening process and then being again sensitized for the subsequent operations.

I claim as my invention—

1. As an article of manufacture, a photographically-printed plate having juxtaposed and structurally-independent portions of its pellicle of differing colors, and lying in the same plane.

2. As an article of manufacture, a photographically-printed multicolored screen, having its colors arranged in juxtaposed bands.

3. As an article of manufacture, a photographically-printed multicolored screen, having its colors arranged in juxtaposed bands in a common plane.

4. As an article of manufacture, a photographically-printed screen, having structurally-independent juxtaposed bands of different colors.

5. As an article of manufacture, a photographically-printed screen, having structurally-independent juxtaposed bands of different colors in a common plane.

6. The herein-described method of producing heliochromic effects, consisting in successively exposing different portions of a sensitized surface to actinic rays, and developing and dyeing the exposed portions; the surface being resensitized intermediate of the exposures.

7. The herein-described method of making heliochromic screens, consisting in successively photographing and dyeing juxtaposed bands in a common plane on a sensitized plate.

8. The herein-described method of making multicolor heliochromic screens, consisting in successively exposing parallel bands of a sensitized plate to actinic rays, dyeing and mordanting the exposed portions, and hardening such portions to reduce their porosity; the portions of the plate intermediate of exposed portions being cleaned and the plate resensitized before each subsequent exposure.

9. The herein-described method of producing heliochromic effects, consisting in successively exposing different portions of a sensitized surface to actinic rays, and developing and dyeing the exposed portions.

10. The method of producing a photographic color-screen, which consists in subjecting the suitably-sensitized coating of a transparent medium to the action of light through a transparency provided with opaque lines, figures or dots to render parts of said coating insoluble and other soluble, and then coloring the insoluble parts and setting the color.

11. The method of producing a photographic color-screen, which consists in subjecting the suitably-sensitized coating of a transparent medium to the action of light through a transparency provided with opaque lines, figures or dots to render parts of said coating insoluble and other soluble, then coloring the insoluble parts by absoption therein of the coloring material, and then setting the color.

12. The method of producing a photographic color-screen, which consists in subjecting the suitably-sensitized coating of a transparent medium to the action of light through a transparency provided with opaque lines, figures or dots, to render parts of said coating insoluble and others soluble, then cleaning the medium of the soluble sensitized material, then coloring the remaining insoluble material and setting the color.

13. The method of producing a photographic color-screen, which consists in rendering insoluble, in lines, figures or dots, the sensitized material on a transparent medium by subjection to light, and then coloring said lines, figures or dots and setting the color.

14. The method of producing a photographic color-screen, which consists in subjecting the suitably-sensitized surface coating of a transparent medium at different parts by successive operations to the action of light, and after each said operation coloring and mordanting the newly-remaining insoluble portions of the coating.

15. The method of producing a photographic color-screen, which consists in subjecting the suitably-sensitized surface coating of a transparent medium at certain parts to the action of light, then cleaning the medium of the remaining soluble material and coloring and mordanting the insoluble parts, again coating the transparent medium between said insoluble colored parts with suitably-sensitized material, subjecting parts of the newly-sensitized surface to the action of light, coloring and mordanting, repeating said operations for each color desired.

16. The method of producing a photographic color-screen, which consists in subjecting the suitably-sensitized surface coating of a transparent medium at certain parts to the action of light, then cleaning the medium of the remaining soluble parts, then applying one coloring-matter to the insoluble parts and mordanting the same, again coating said transparent medium between said insoluble colored parts with suitable sensitized material, subjecting parts of the newly-sensitized surface to the action of light, then cleaning the medium of the remaining soluble material, then applying another and different coloring-matter to be absorbed by the then new insoluble surface and mordanting the same, again coating said transparent medium between said colored parts with suitable sensitized material, and then when the same is rendered insoluble applying thereto a still different coloring-matter to be absorbed by the new insoluble surface and mordanting the same.

17. The method of producing a photographic color-screen, which consists in subjecting the suitably-sensitized surface coating of a transparent medium to light through a plate of transparent material, provided with opaque lines, dots or figures, the relative positions of the plate and said medium being changed with each operation, and intermediate of said operations coloring and mordanting, substantially as and for the purpose set forth.

18. The method of producing a photographic color-screen, which consists in subjecting the suitably-sensitized surface coating of a transparent medium at certain parts to the action of light, then cleaning the medium of the remaining soluble sensitized parts, then applying one coloring-matter to the insoluble parts and mordanting the same, again coating said transparent medium between said insoluble colored parts with sensitized material, subjecting parts of the newly-sensitized surface to the action of light, then cleaning the medium of the remaining soluble sensitized material, then applying another and different coloring-matter to be absorbed by the new insoluble surface and mordanting the same, again coating the transparent medium between the then colored parts with sensitized material to produce a third new insoluble surface and applying thereto a still different coloring-matter to be absorbed by the then new insoluble surface and mordanting the same, and finally coating the colored surface with transparent protecting material.

19. The method of producing a photographic color-screen, which consists in providing a transparent plate having opaque lines, figures or dots thereon, separated by clear spaces, the opaque and clear portions of the plate being so arranged that one occupies twice the area of the other, subjecting the suitably-sensitized surface coating of a transparent medium to the action of light through said plate, cleaning said medium of the remaining soluble material and coloring and mordanting the then remaining insoluble material, again coating the transparent medium between said colored parts with sensitized material and repeating said operations by printing through the said plate in a different position and then coloring, employing a different color in each coloring operation, substantially as set forth.

20. The method of producing a photographic color-screen, which consists in subjecting the suitably-sensitized surface coating of a transparent medium at parallel parts by successive operations to the action of light through a lined, opaque screen, and after each said operation coloring and mordanting the insoluble portions of the coating.

21. The method of producing a lined photographic color-screen, which consists in providing a transparent plate having parallel opaque lines with spaces between them one-half the width of the lines, subjecting the suitably-sensitized surface coating of a transparent medium to the action of light through said plate, coloring and mordanting the then insoluble material, again coating the transparent medium between said colored parts with sensitized material, subjecting it to light through the opaque-lined plate in another position and coloring and mordanting the then new insoluble material, and repeating said operations by printing through the opaque-lined plate in different positions, and then coloring, until the surface of the transparent medium is completed, employing a different color in each coloring operation, substantially as set forth.

JOHN H. POWRIE.

Witnesses:
 Louis K. Gillson,
 Arthur B. Seibold.